May 27, 1930.  C. R. SHORT  1,760,852

FLEXIBLE COUPLING

Filed Aug. 28, 1926

Inventor
Charles R. Short

By Alexander, Spencer & Finch
Attorneys

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

FLEXIBLE COUPLING

Application filed August 28, 1926. Serial No. 132,284.

This invention relates to tumbling or universal joints adapted to transmit torque from driving to driven shafts disposed end to end. It relates more particularly to a flexible coupling element forming part of the universal joint for the purpose of permitting the shafts to assume a position at an angle to each other without disturbing the power transmitting function of the joint.

The invention resides in a flexible coupling element composed of strands and deformable resilient material, such as rubber, so disposed that the driving strains will be evenly distributed to the several strands even when the element is buckled from its normal plane.

In the accompanying drawings in which like reference characters indicate like parts throughout the several views, Fig. 1 is a face view of a coupling element made in accordance with this invention;

Figure 1:
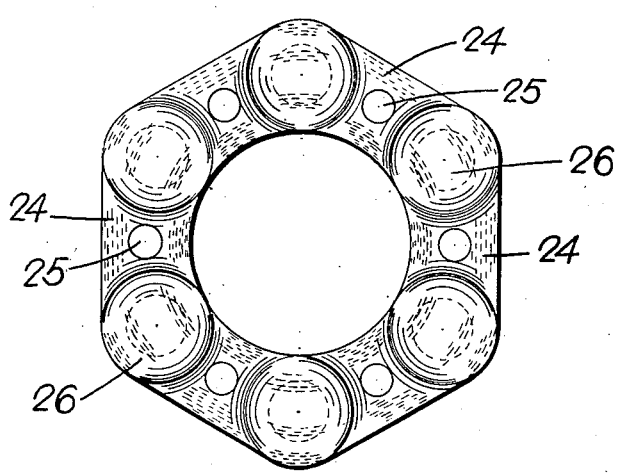
Figure 2:
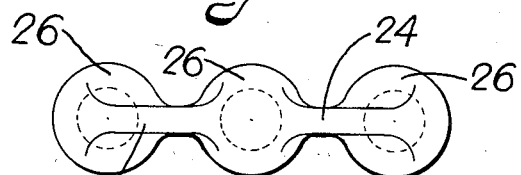
Fig. 2 is an edge view of the element shown in Fig. 1.

A coupling element, as illustrated in Figs. 1 and 2, is designed to be attached to driving and driven spiders, by clamping bolts passed through every other hole 25 into a driving spider, and through the remaining holes into a driven spider. The element illustrated is composed essentially of several plies or layers of cord strands extending circumferentially, the plies being compacted in substantial contact with one another to form flattened portions 24 in which the perforations 25 are disposed, and the flattened portions alternating with expanded portions 26 consisting of a core of resilient substance such as tough elastic rubber enveloped by cord strands extending side by side from one flat portion 24 to another. The plies of cord strands may be separated by a thin sheet of bias woven fabric, or other stretchable, sheet material, coated or impregnated with rubber or other preferably vulcanizable binder.

A coupling element of this construction may undergo buckling or deflection out of its normal plane during rotation of the driving and driven shafts around axes which are at an angle with respect to each other, without unduly straining or unevenly tensioning the cords or fabric owing to deformation of the resilient cores. The cores may deform although substantially inclosed because the yarns of the sheet fabric are oblique with respect to the circumferential center line passing around the disk through the cores, and because the strands which lie side by side but not bound to one another, may spread under internal pressure.

Figure 3:
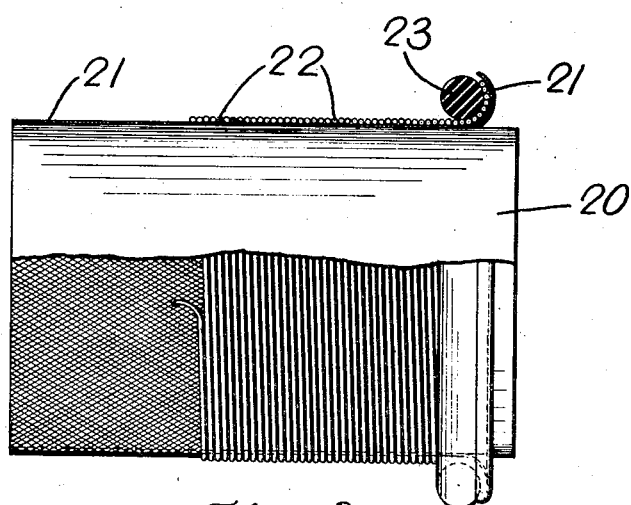
Fig. 3 illustrates a step in the method of making said element.

A coupling element or disk of the kind described may be made as follows:

Upon a mandrel 20 may be sleeved or wrapped a single-layer of a stretchable sheet material such as rubberized fabric 21 arranged on the mandrel so that the yarns thereof run on a bias relative to the axis of the mandrel as illustrated. After the layer of fabric is placed upon the mandrel a layer of strands preferably rubberized cord 22, is wound about the sheet material, the adjacent strands or turns of cord lying in close proximity to each other. After the cord is wound on the layer of sheet material a ring 23 of a compound capable of being molded and cured into a tough elastic substance such as rubber is slipped over the cylinder at one end and over corresponding ends of the layers of cord and fabric. Following this, as illustrated in Fig. 3, the fabric and cord are flared at one end and rolled with the ring 23 lengthwise over the periphery of mandrel 20 forming a blank of the kind illustrated in Fig. 4. There is thus produced a moldable ring 23 covered with alternate layers of cord 22 and fabric 21 spirally rolled around it. The cord turns run circumferentially of the ring 23 with reference to its center while the fabric threads or yarns extend obliquely around the ring and are therefore disposed on a bias.

Figure 4:
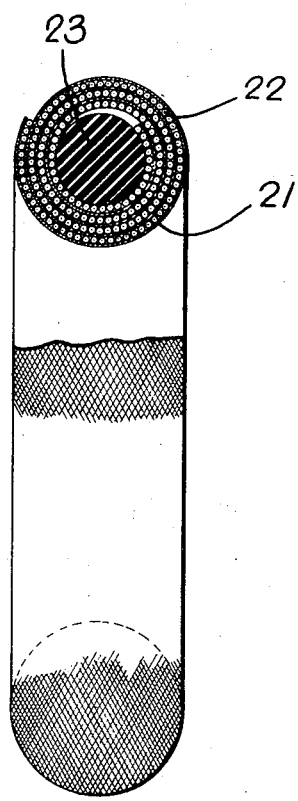
Fig. 4 shows, on a larger scale, a blank ready to be molded into the contour illustrated in Figs. 1 and 2.

The blank illustrated in Fig. 4 may then be placed in a suitable die having molding surfaces which are counterparts of the upper and lower surfaces of the finished element shown in Figs. 1 and 2. The die is preferably heated. Pressure applied to the die causes displacement of the moldable ring substance from areas 24, the displaced substance flowing into the intermediate portion 26. Where the rubber or other moldable substance composing ring 23 is squeezed from between the layers at the parts indicated by the numeral 24, the cord and fabric layers will be pressed together, providing thin attachment portions which constitute the sections that are to be bolted and clamped to the spiders. In these portions holes 25 are then provided for receiving bolts or studs which secure the disc to the coupling spiders, not shown in the drawings. The thin attachment portions may be made relatively hard and inflexible by applying to the cords and fabric where these portions are to be formed, a compound which will cure hard.

The compound or substance displaced from the sections 24 expands the layers formed of cord 22 and fabric 21 so that these intermediate sections 26 may assume a general spherical contour having a highly resilient core substantially surrounded by general parallel strands of cord which may separate slightly under internal pressure and by the bias woven fabric 21 which may yield and stretch.

In the operation of a tumbling joint in which the described flexible element is embodied, the strands being circumferentially wound about the ring-shaped element will take the torque, the fabric acting mainly to restrain the strands from individually sinking into the yieldable mass. Upon an increased load the cords that pull upon a spider arm will tend to stretch, through compressing and flattening the resilient cores between them. As soon as the load is decreased, the resilient cores will again expand. When the flexible element is deflected or buckled from one plane the yielding of the rubber core will compensate for the increased distances between the spider arms so that at no time will there be any slack in the strands.

Although as required by the patent act I have shown one specific embodiment of my novel coupling element and have described a specific method by which it may be made, I do not intend to be limited to the specific details shown and described, but only by the appended claims.

What I claim and desire to secure by Letters Patent is:

1. A flexible coupling element comprising strands and cores of deformable resilient substance completely enveloped by the strands at separated location, said cores deflecting the strands enveloping them.

2. A flexible coupling element as defined in claim 1 in which substantially all the strands are in substantial contact one with another between the cores, constituting flattened portions adapted to be secured to driving and driven members.

3. A flexible coupling element as defined in claim 1 in combination with a bias-woven fabric interposed between layers of strands.

4. A flexible coupling element as defined in claim 1 in which the strands are fibrous cords impregnated with a binder vulcanized to the resilient core and to one another.

5. A flexible coupling element as defined in claim 1 in which the strands are fibrous cords impregnated with a binder and vulcanized to the resilient core and one another, the strands between the cores constituting flattened portions.

6. A flexible coupling element as defined in claim 1 in combination with yieldable sheet material interposed between layers of strands, said strands, sheet material and resilient core being bonded together.

7. A flexible coupling element as defined in claim 1 in combination with bias woven fabric impregnated with a binder, the core, strands and fabric being vulcanized together.

In testimony whereof I affix my signature.

CHARLES R. SHORT.